United States Patent
Thomson et al.

(10) Patent No.: US 6,307,920 B1
(45) Date of Patent: *Oct. 23, 2001

(54) MICROPROCESSOR CONTROLLED DISPATCHER ACTIVATED RESPONSE IDENTIFICATION SYSTEM WITH TELEPHONE AND RADIO FREQUENCY INTERFACE

(75) Inventors: James D. Thomson, Bellevue; James D. Heckelman; Larry S. Howe, both of Norwalk, all of OH (US)

(73) Assignee: Foresight Technologies, Inc., Bellevue, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/159,432

(22) Filed: Sep. 24, 1998

Related U.S. Application Data

(63) Continuation-in-part of application No. 08/867,679, filed on Jun. 2, 1997, which is a continuation of application No. 08/534,341, filed on Sep. 27, 1995, now Pat. No. 5,636,263, which is a continuation of application No. 08/215,309, filed on Mar. 21, 1994, now abandoned.

(51) Int. Cl.⁷ .................................................. H04M 11/00
(52) U.S. Cl. ........................ 379/45; 379/37; 379/102.01; 340/331
(58) Field of Search .................................. 379/45, 37, 38, 379/39, 102.01, 102.06, 396; 340/539, 331, 332

(56) References Cited

U.S. PATENT DOCUMENTS

| | | |
|---|---|---|
| 4,587,753 | 5/1986 | Harper . |
| 4,596,900 | 6/1986 | Jackson . |
| 4,611,265 | 9/1986 | Davis . |
| 4,760,593 * | 7/1988 | Shapiro et al. ........................ 379/38 |
| 4,878,236 | 10/1989 | Ray et al. . |
| 4,931,780 | 6/1990 | LaMont et al. . |
| 4,935,951 | 6/1990 | Robinson et al. . |
| 4,993,058 | 2/1991 | McMinn et al. . |
| 5,012,507 | 4/1991 | Leighton et al. . |
| 5,287,398 | 2/1994 | Briault . |
| 5,589,818 * | 12/1996 | Queen ................................... 379/45 |
| 5,621,379 * | 4/1997 | Collins ................................... 379/45 |
| 5,629,687 * | 5/1997 | Sutton et al. .......................... 379/37 |
| 5,636,263 | 6/1997 | Thomson . |
| 5,748,706 * | 5/1998 | Morgan et al. ........................ 379/37 |
| 5,880,672 * | 3/1999 | Weaver ................................... 379/45 |
| 5,960,061 * | 9/1999 | Fahie et al. ............................ 379/45 |
| 6,009,148 * | 12/1999 | Reeves ................................... 379/37 |

* cited by examiner

*Primary Examiner*—Stella Woo
(74) *Attorney, Agent, or Firm*—Fay, Sharpe, Fagan, Minnich & McKee, LLP

(57) ABSTRACT

A signaling system (10) in the form of a dispatcher activated response identification system is provided for responding exclusively to a predefined signal transmitted from a first location through a telephone service line interconnected thereby with a telephone at a second location to assist responding personnel in identifying the second location when the predefined signal is transmitted from the first location. The signaling system includes first and second electronic circuits (40, 60) at the second location. The first electronic circuit is adapted to generate a first signal (58) at the second location in response to receiving the predefined signal transmitted through the telephone service line. The second electronic circuit is physically separated from the first electronic circuit and is preferably placed where it is easily visible from the street such as in a window. The second electronic circuit generates a visual indicia at the second location in response to the first signal being transmitted from the first circuit. Preferably, the visual indicia is generated by a stroboscopic light emitting diode. The first electronic circuit is responsive to dual tone (DTMF) signals, a sequence of tone signals, or modem signals transmitted on the telephone service line. In an alternative preferred embodiment, the first electronic circuit is responsive to radio frequency signals transmitted from the dispatcher to the caller's location.

20 Claims, 6 Drawing Sheets

MICROPROCESSOR CONTROLLED DISPATCHER ACTIVATED RESPONSE IDENTIFICATION SYSTEM WITH TELEPHONE AND RADIO FREQUENCY INTERFACE

CROSS-REFERENCE TO RELATED APPLICATIONS

This is a continuation-in-part of Ser. No. 08/867,679, filed Jun. 2, 1997 which was a continuation of Ser. No. 08/534,341, filed Sep. 27, 1995, now U.S. Pat. No. 5,636,263 which was a continuation of Ser. No. 08/215,309, filed Mar. 21, 1994, abandoned.

BACKGROUND OF THE INVENTION

The subject invention is directed toward the art of dispatcher activated response identification systems and, more particularly, to a microprocessor controlled dispatcher activated response identification system that is adapted to be responsive exclusively to tone sequences, dual tone signals or modem signals transmitted via standard telephone lines in one embodiment and, in an alternative embodiment, to be responsive exclusively to radio frequency signals transmitted from a remote dispatcher location.

The invention is particularly useful when used in connection with emergency services personnel such as "9-1-1" operators or dispatchers and will be described with particular reference thereto; however, the invention is capable of broader application and could be used in many other environments including anywhere responding personnel are dispatched from a central location to homes or business establishments within a community such as, for example, by security alarm companies, home monitoring groups, ambulance or health care services, or the like.

It is a well-know and common complaint of rescue workers that they cannot quickly identify the location of an emergency to which they have been dispatched. Although many communities have installed what is called "enhanced 9-1-1" service in which the address of the emergency caller's location is presented on a display unit at a central remote dispatcher's console, this enhanced service is not universally available. Further, it does not completely solve the problems faced by the dispatched responding personnel who must quickly find the specific location, which may be difficult even when address information is immediately available. In addition, in new housing developments or where new homes are built in previously uninhabited regions, the street names and addresses are not always updated in the records of the police and fire departments or in the files of governmental agencies or commercial home alarm services. In those cases, the location of the caller in need of emergency services or other quick response is not readily ascertainable.

Some of the problems identified above have been previously recognized by prior inventors who have offered their solutions in the form of published patents and commercial products. It is already known to combine a basic house address display device with an emergency flashing light such as shown, for example, in U.S. Pat. No. 4,611,265 issued to Davis in 1986. The Davis device uses an address display system in which the house numerals are disposed on a translucent wall of a housing illuminated from within by a conventional incandescent bulb. A flashing emergency light is also disposed within the housing. The emergency light may be actuated by the occupant from a remote switch within the residence to warn passers-by of the need for assistance. Generally similar to the Davis device, U.S. Pat. No. 4,587,753 issued in 1986 to Harper provides a device that includes an indicia display system that flashes a red light to warn of an emergency occurrence within individual houses.

U.S. Pat. No. 4,993,058 issued in 1991 to McMinn teaches an alarm signaling system responsive to outgoing calls that are placed to a predetermined number sequence, preferably, "9-1-1", made on a telephone line of a residence whereby, once triggered, the alarm system remains activated whether or not the telephone is placed in an on-hook condition and until a reset number sequence is dialed. The alarm system remains activated while additional calls are placed on the same telephone and until a reset number sequence is dialed. A test number sequence may be dialed to set the system in the alarm state without actually placing an emergency call.

It will be seen below that the present invention provides improvements over other previous inventions in many ways. In particular, the system of the present invention is capable of being placed in an active or alarm state only by the "9-1-1" dispatcher, emergency services dispatcher, security alarm company dispatchers, or other dispatchers having a suitable dual tone (DTMF) generator, tone sequence generator, or modem signal generator in one embodiment, or having a radio frequency signal generator in another embodiment. The apparatus of the present invention includes a visual indicia, preferably a stroboscopic light emitting diode, that is activated remotely exclusively by a signal sent by an emergency or security dispatcher. In use, the dispatcher activates the visual indicia only when the appropriate responding personnel are dispatched, thereby eliminating the potential for misuse of the device. In addition, suppliers of other emergency or alarm systems that dispatch response teams and who are accessed by calls to a telephone number other than "9-1-1" can also control the visual locating indicia herein described because the present invention includes a programmable microprocessor control circuit that is programmable to selectively respond to a wide variety of tone signals, sequences of tone signals, modem signals or radio frequency signals.

The stroboscopic light emitting diode comprising the visual locating indicia is preferably placed in the front window of a residence or attached to an exterior surface of the structure such as, for example, beneath a doorbell, adjacent an address placard on the building, or elsewhere. Alternatively, the light can be attached physically apart from the structure such as on a utility pole or on other support structures located in the yard of the residence or commercial building.

Misuse of any of the aforementioned prior art alarm systems may result from subscribers who activate the alarm system to aid a delivery person find the proper house to which to make a delivery, and by "9-1-1" calls for non-emergency situations. To prevent such misuse, the present invention is responsive exclusively to predefined special signals that can originate only from dispatchers. Only the dispatchers are provided with the ability to generate the special signals that are required. As such, the instant device does not permit activation of the visual locating signal by inadvertent or non-essential calls to dispatchers. In the present invention, the caller does not have the ability to activate the system. Rather, the decision to activate the visual locating indicia is made exclusively by the dispatcher.

Using the McMinn system, when multiple calls from callers at various locations are made to "9-1-1" to report an emergency condition, each caller's emergency locator system is activated at least momentarily, creating the potential for the responding emergency team to become confused as to the exact location of the emergency. In contrast to McMinn as described above, using the system of the present invention, only the dispatcher has the ability to activate the building identification signal at his or her discretion and further, would elect to activate such signal at only one single location identified as the exact location of the emergency or security breach.

Some prior response identification systems are powered entirely by voltage that is present on the telephone line. Others rely entirely on the electric power service existing in the commercial structure or private residence. In many situations, the electric power systems in buildings become disrupted or otherwise damaged by the emergency or alarm condition that exists within the structure. Similarly, in systems that are powered by the telephone line, service may be disrupted thereto causing device failure. The preferred embodiment of the present invention is powered the electric service connection existing in the structure and also includes auxiliary rechargeable batteries that receive a continuous replenish charge from the electric power grid within the structure. The rechargeable batteries serve as a back-up when the electric power in the building becomes disrupted. At such times, the rechargeable batteries provide a ready source of energy to enable activation of the microprocessor and ancillary circuits comprising the subject dispatcher activated response identification device of the invention. In an alternative embodiment, the batteries are recharged by the telephone service line and in still yet other alternatives, the device of the subject invention is powered by the electric or telephone service line without rechargeable battery back-up.

For the above and other reasons, it is desirable to provide a dispatcher activated response identification system that is activated exclusively by dispatchers that have the ability to generate a dual tone (DTMF) signal, multiple tones in sequence or in combination, or appropriate modem signals that are sent over the telephone line to selectively activate visual locating indicia disposed at the caller's location to enable responding personnel to easily find the caller. It is further desirable to provide a dispatcher activated response identification system that is activated exclusively by dispatchers that have the ability to generate radio frequency signals that are sent through the air to selectively activate visual locating indicia disposed at the caller's location to enable responding personnel to easily find the caller. It is intended that the dispatcher activate the visual indicia by sending the appropriate signal only upon the dispatching of response personnel to attend to the emergency or other condition or need that exists or is reported to exist by the caller.

It is further desirable to provide a dispatcher activated response identification system that includes a telephone interface and a microprocessor circuit to enable the system to receive, decode, and respond to the dual tone (DTMF) signals, multiple tones in sequence or in combination, or appropriate modem signals that are sent over the telephone line by the dispatcher. It is also further desirable to provide a dispatcher activated response identification system that includes a radio frequency interface and a microprocessor circuit to enable the system to receive, decode, and respond to the radio frequency signals that are sent through the air by the dispatcher.

It would also be desirable to provide a dispatcher activated response identification system that is powered by rechargeable batteries connected to the electric utility power system within a dwelling or commercial building. The batteries would provide power to the system in the event of catastrophic failure of the power grid. As an alternative, the response identification system could be connected to the telephone service line so that the batteries could be recharged using the voltage signals provided thereon. In still yet another alternative, the subject response identification system could be connected directly to the electric utility line or to the telephone service line.

It would further be desirable to provide the response identification system with a low battery indicator that generates a signal when the charge level on the batteries drop below a predetermined threshold. In that way, the batteries could be replaced, recharged, or otherwise serviced as necessary but before the charge level drops below a level that would render the system inoperative.

It would also be desirable to provide the response identification system with a visual indicia time out function so that the visual indicia becomes de-energized after a predetermined time period after it is enabled. Preferably, the predetermined time period is programmable. As an alternative, it would be desirable to provide the response identification system with the ability for the visual indicia, once energized, to be extinguished by dispatcher remotely by sending the appropriate signal to the system from the dispatcher's location to the caller's location. As yet another alternative, it would be desirable to provide the response identification system with the ability for the visual indicia, once energized, to be extinguished by the responding personnel after they reach the caller's location.

SUMMARY OF THE INVENTION

In accordance with the present invention, a signaling system is provided that is responsive exclusively to a predefined signal transmitted from a first location by a dispatcher to assist responding personnel in identifying a second location to quickly find a caller in need of assistance. The dispatcher may be an emergency operator who must respond to an emergency call and dispatch response personnel into a community to locate the structure from which an emergency call has been placed. The present invention is useful in all dispatcher-type services such as, for example, security alarm companies or health care establishments that contract with business or residential clients to dispatch responding security or health care personnel to locations from which alarm signals or calls for assistance are generated.

In a first preferred embodiment of the invention, the signaling system is responsive exclusively to a predefined signal transmitted from a dispatcher's location through a telephone service line interconnected thereby with a telephone at a caller's location to assist responding personnel in identifying the caller's location when the predefined signal is transmitted from the dispatcher's location to caller's second location. Preferably, the signaling system includes a first electronic circuit interconnected directly with the telephone service line. The first electronic circuit includes a programmable microprocessor and is adapted to generate a first signal locally at the caller's location in response to receiving the predefined signal transmitted through the telephone service line. Further, the signaling system includes a second electronic circuit associated with the first electronic circuit at the caller's location. The second electronic circuit is disconnected from the telephone service line and is preferably positioned in a manner making it easily observable, such as in a window or on a pole, by the responding personnel that are dispatched to the caller's location. The second electronic circuit includes a programmable microprocessor and is adapted to generate a visual locating indicia at the caller's location in response to the first signal transmitted from the first circuit. The visual locating indicia is preferably directly intelligible by the responding personnel so that they can easily identify the location from which the service call was placed.

In another preferred embodiment of the present invention, a signaling system is provided that is responsive exclusively to a predefined radio frequency signal transmitted from a dispatcher at a first location through the air to a caller at a second location to assist responding personnel associated with the dispatcher in identifying the caller's location from among other locations nearby when the predefined radio frequency signal is transmitted from the dispatcher's location to the caller's location. In accordance with this preferred embodiment of the invention, the signaling system includes a radio frequency receiving circuit adapted to receive the first radio frequency signal from the dispatcher's location and develop a first electronic signal in response to receiving the first radio frequency signal. The signaling system further includes a decoding circuit adapted to decode the first electronic signal and generate a decoded signal. A programmable microprocessor circuit in the signaling system is adapted to receive the decoded signal and generate a locating indicia enable signal when the decoded signal matches a predetermined identification code stored in the programmable microprocessor circuit. A visual locating indicia device, preferably a stroboscopic light, is operatively connected to the programmable microprocessor circuit and is responsive to the locating indicia enable signal to generate a visible locating signal at the caller's location in response to the first radio frequency signal transmitted from the dispatcher's location. The visual locating signal is directly intelligible by the responding personnel to assist them in identifying the caller's location from among other locations in the area of the service call origin.

In accordance with a more limited aspect of the invention, the signaling system of the first preferred embodiment includes first and second electronic circuits that are each disposed at the caller's location. The first electronic circuit includes a decoder circuit adapted to decode the predefined signal transmitted through the telephone service line and generate a decoded signal. A microprocessor control circuit in the first electronic circuit is adapted to receive the decoded signal and generate a radio frequency enable signal in response to receiving the decoded signal. A radio frequency transmitting circuit generates the first signal to be transmitted using radio waves from the first electronic circuit to the second electronic circuit at the caller's location. The radio frequency transmitting circuit generates the first signal in response to the radio frequency enable signal generated by the first microprocessor control circuit. The decoder and first microprocessor control circuits of the first electronic circuit sense and decode tone signals, dual tone (DTMF) signals, sequences of tones imposed on the telephone line, or modem tone signals also transmitted on the telephone line.

In accordance with a further aspect of the first preferred embodiment of the invention, the second electronic circuit is physically separated from the first electronic circuit at the caller's location and is preferably positioned in or near a window, on the porch or on the outside of the structure or in the yard so that it is easily seen. The second electronic circuit is in radio frequency communication with the first electronic circuit. To that end, the second electronic circuit includes a radio frequency receiving circuit adapted to receive the first signal from the radio frequency transmitting circuit and to then generate an acknowledgment signal in response to receiving the first signal. The acknowledgment signal is used locally within the second electronic circuit by a second microprocessor control circuit located therein adapted to receive the acknowledgment signal and then generate a locating indicia enable signal in response to receiving the acknowledgment signal. A light, preferably a stroboscopic light emitting diode, is operatively connected to the second microprocessor control circuit and is responsive to the locating indicia enable signal to generate a visual locating indicia at the second location to assist the responding personnel in identifying the caller's location from among other locations in the area.

In accordance with a more limited aspect of the invention, the signaling system is powered by rechargeable batteries connected to the electric utility power system within a dwelling or commercial building. The batteries provide power to the system in the event of catastrophic failure of the power grid. As an alternative, the system is connected to the telephone service line so that the batteries are recharged using the voltage signals provided thereon. In still yet another alternative, the subject signaling system is directly connected to the electric utility line or to the telephone service line.

In a yet more limited aspect of the invention, the signaling system includes a low battery indicator that generates a signal when the charge level on the batteries drop below a predetermined threshold. In that way, the batteries could be replaced, recharged, or otherwise serviced as necessary but in any case before the charge level drops below a level that would render the system inoperative.

In a yet more limited aspect of the invention, the signaling system includes a visual indicia time out function so that the visual indicia becomes de-energized after a predetermined time period after it is enabled. Preferably, the predetermined time period is programmable. As an alternative, the signaling system includes the ability for the visual indicia, once energized, to be extinguished by dispatcher remotely by sending the appropriate signal to the system from the dispatcher's location to the caller's location. In yet another alternative, the signaling system includes the ability for the visual indicia, once energized, to be extinguished by the responding personnel after they reach the caller's location.

It is a primary object of the invention to provide a device that is responsive exclusively to a predefined signal transmitted from a dispatcher's location to cause a circuit at a caller's location to apply a voltage that activates a signal LED thereby to produce a highly noticeable visual indicia identifying the location to which emergency or security response personnel have been dispatched.

It is to be noted that the present invention does not require that the caller have a touch-tone telephone. The use of the present invention is not limited to touch-tone phones or touch-tone systems but, rather, can be used by owners of rotary telephone equipment and on rotary switching telephone systems. The present invention requires only that the caller has the ability to place an emergency or alarm related call to a dispatcher.

It is another object of the present invention to provide a signaling system that can be tuned to detect tones different from that which can normally be generated by the standard touch-tone telephone. Such special tones may be generated from special terminals used by "9-1-1" dispatchers or by others who dispatch emergency, security, or health care assistance. It is also within the scope of the present invention that the special dual tone (DTMF) signals, sequence of tone signals, or modem signals can be generated by a hand-held tone generator intended to be carried by the responding personnel. In addition, the special radio frequency signals used in accordance with the second preferred embodiment of the invention can be generated by the responding personnel with knowledge of the predetermined identification codes stored in the programmable microprocessor circuits at the caller's location.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, the preferred embodiments of which will be described in detail in this specification and illustrated in the accompanying drawings which form a part hereof, and wherein.

DETAILED DESCRIPTION OF THE PREFERRED EMBODIMENTS

Figure 1:
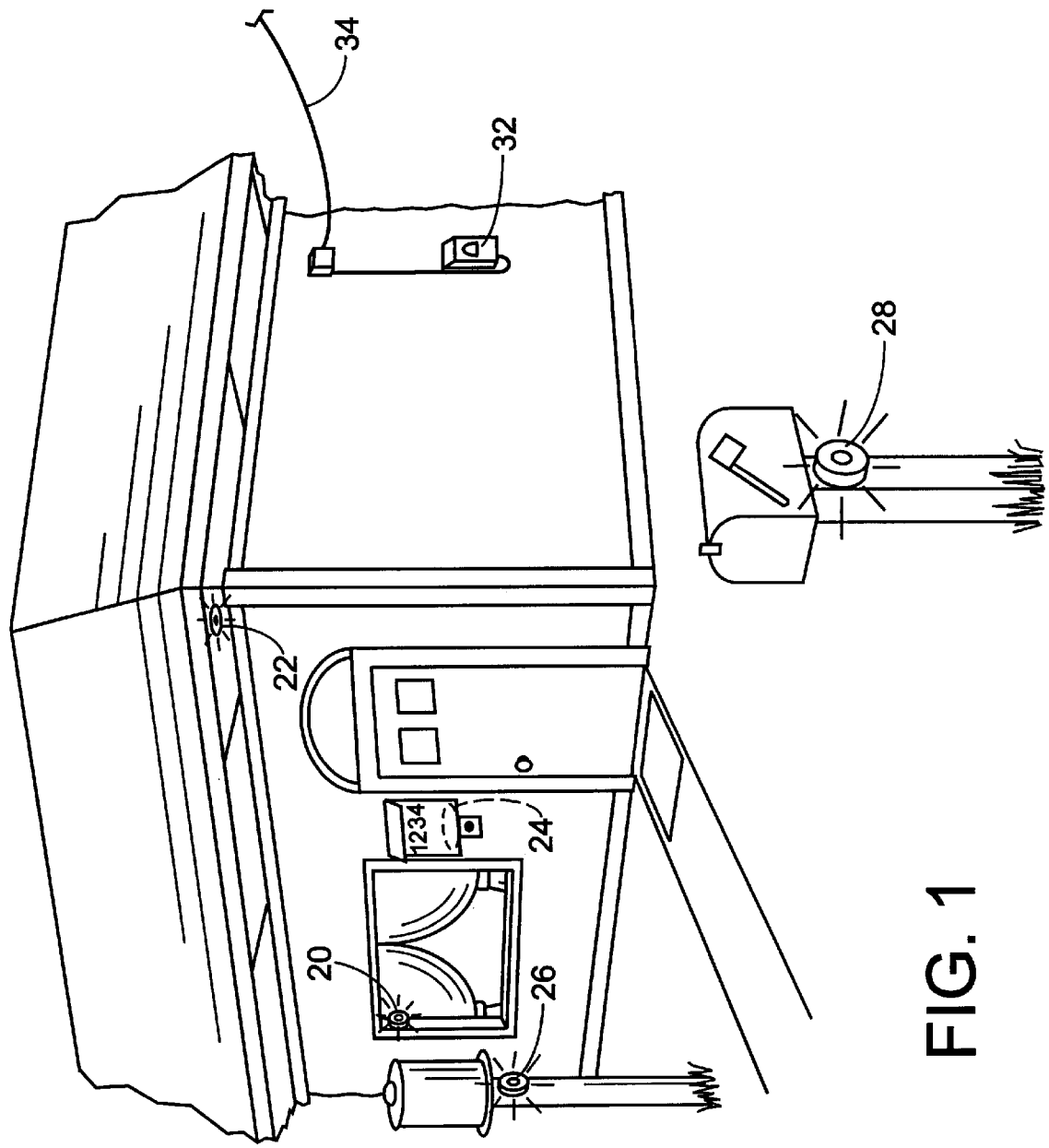
FIG. 1 illustrates a portion of a structure showing various preferred locations where the visual indicia of the present invention might be located.

Referring now to the drawings wherein the showings are for the purposes of illustrating the preferred embodiments of the invention only and not for purposes of limiting same, FIG. 1 illustrates a structure of a caller's home showing that the visual locating indicia, preferably locator signal flashers, may be disposed in one or more places visible from outside the structure and preferably visible from a street or road nearest to where the structure is located. Some illustrative examples include mounting the flasher inside a window, as at 20; under the eaves as at 22; in a lighted address display unit or doorbell site, as at 24; in an exterior light on or around the structure, as at 26; and on the mailbox or post supporting the mailbox, as at 28. It is clear that the subject signal flashers can be placed at various or multiple locations, usually, but not limited to, outside a structure.

Throughout the disclosure of the present invention the word "structure" is used but should not be interpreted as being a single or multiple unit dwelling but, rather, as including single or multiple family homes, single apartments, apartment buildings, business locations, individual office or office suites, office buildings, retail establishments, factories, warehouses, or even single, free-standing telephone booths, any of which has an installed telephone. In short, a "structure" as used herein includes anything that comprises a telephone connected to a fixed location.

FIG. 1 also illustrates the telephone service entrance box 32 with the service line from the telephone company 34 through which the system of the present invention is used to place a call for assistance from the caller's location to the dispatcher's location. It is well known in the art that the service line from the telephone company 34 carries variable voltage representing telephone conversations as well as a ringer signal. In that regard, each telephone circuit in the incoming line comprises a cable pair, referred to in the trade as the "tip" and the "ring." The telephone company imposes on this cable pair a constant direct current voltage, usually 48 volts, with the ring being at ground potential and the tip being at +48 volts. When a call is received, a 90 volt alternating current voltage is imposed over the 48 volt direct current voltage as a ringer signal that causes the ringer in the telephone set to annunciate a call. The alternating current ringer signal is extinguished when the telephone is answered. Telephone conversations and any other sound to be transmitted appears on this circuit as a modulated signal of widely varying frequency imposed upon the DC voltage present in the circuit. It is to be noted that for standard telephones, no electrical energy not provided over the cable pair is needed for any function of the telephone.

In many emergencies, the electrical service to the structure may be interrupted while the telephone service remains uninterrupted. Thus, in accordance with the present invention, an electrochemical cell or battery is used as the source of electric power for the signaling system to make the present invention very reliable. To that end, the subject invention uses rechargeable batteries that are automatically held at maximum charge through direct connection of a power supply to the electric service to the structure. The power supply provides a continuous trickle re-charge current to the batteries. Thus, in the event that the electric service to the structure is interrupted during an emergency, the batteries provide a ready source of power to enable the operation of the subject signaling system. Alternatively, the rechargeable batteries used in the electronic circuits of the subject invention can be kept fully charged by power delivered over the telephone cable pair in the event that electric service to the structure is not available or to provide a secondary back-up source of rechargeable power to the batteries. Other alternatives, though perhaps less desirable, include connecting the subject signaling system directly to either the electric service lines to the structure or to the telephone service lines.

Figure 2:
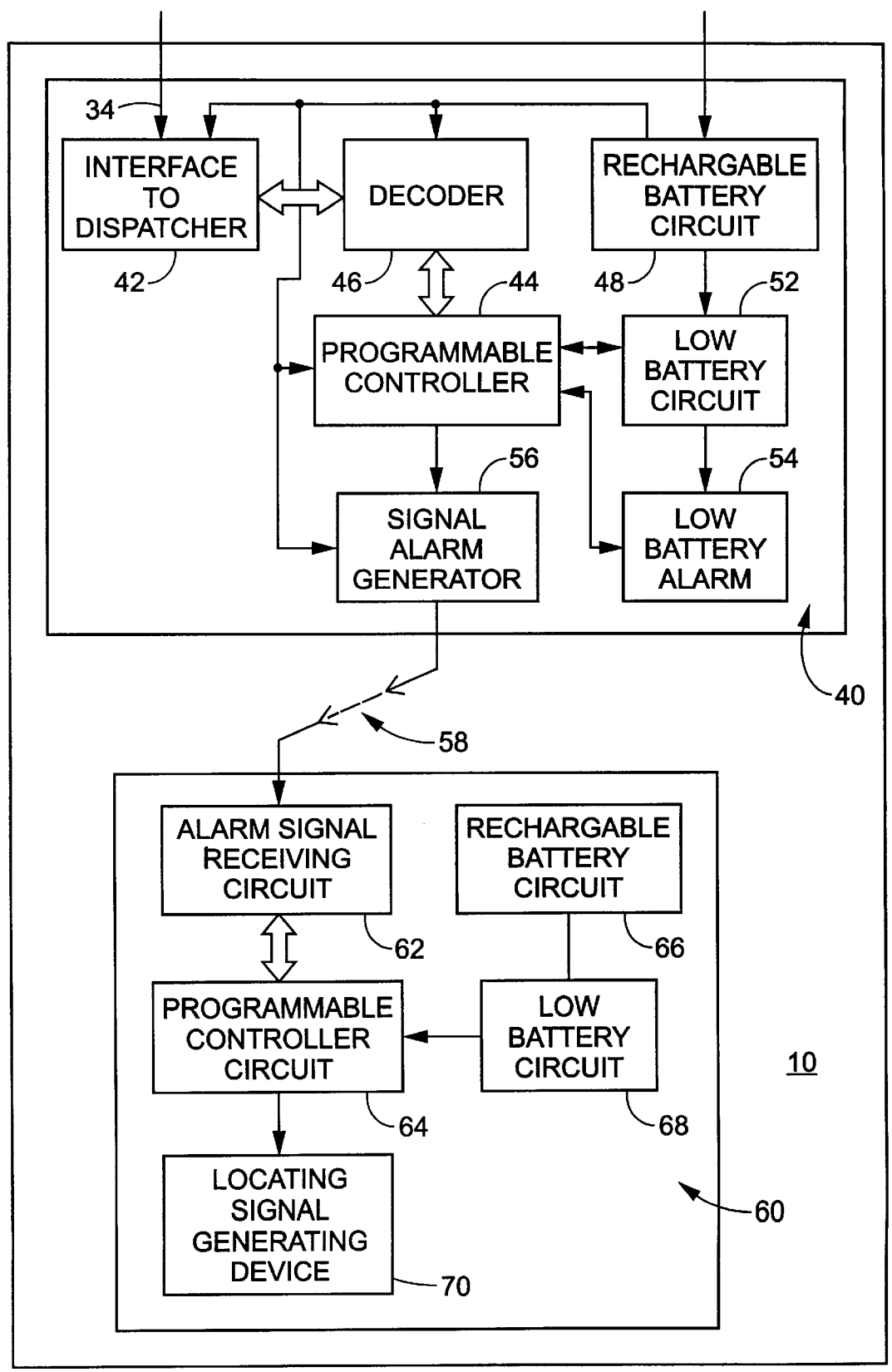
FIG. 2 is a block diagram showing the elements of the electronic circuits forming the preferred embodiments of the present invention.

Turning now to FIG. 2, a block diagram of the subject signaling system 10 is illustrated wherein a first electronic circuit 40 is interconnected to the telephone company service line 34 through an interface circuit 42. The details of each of the individual blocks illustrated in FIG. 2 will be described in detail below in connection with FIGS. 3–5. A programmable controller circuit 44 communicates with the interface to the dispatcher through a decoder circuit 46. The decoder circuit functions to read the signals established by the interface circuit 42 and encode those signals into a format that is readily usable by the programmable controller circuit 44. Preferably, the interface and decoder circuits 42, 44 are bidirectional to enable the programmable controller circuit to both receive signals from the telephone service line 34 as well as transmit verification or confirmation signals therethrough to the appropriate dispatch personnel.

With continued reference to FIG. 2, the first electronic circuit 40 further includes a rechargeable battery circuit 48 that is connected to an operatively associated external source of electrical power through a power connection line 50 as shown. Preferably, as indicated above, the source of external power is provided by the electric service to the structure in which the subject invention is disposed. Alternatively, the source of external power may be provided by the telephone service line to the structure.

A low battery circuit 52 is operative with the programmable controller circuit 44 to periodically test the charge level in the rechargeable battery and, when the level in the battery is below a predetermined threshold value, a low battery alarm circuit 54 is energized by the programmable controller circuit 44 to annunciate this potentially dangerous situation. The annunciation may be in the form of an alarm tone that is audible to occupants of the dwelling, a light signal that can be seen by the occupants, combinations of light and sound, or the like.

Lastly in connection with the first electronic circuit 40, a signal alarm generator circuit 56 is responsive to the programmable controller circuit 44 to generate an alarm signal 58 whenever the dispatcher transmits predetermined signals from the dispatcher's location to the first electronic circuit 40 at the caller's location via the telephone service line 34.

The alarm signal 58 is used by a second electronic circuit 60 forming the subject signaling system 10 in accordance with the present invention. The second electronic circuit 60 is preferably physically spaced apart from the first electronic circuit and is further preferably adapted to be placed in or at the various mounting locations 20–28 near the residence or structure as identified above. The second electronic circuit 60 includes an alarm signal receiving circuit 62 for receiving the alarm signal 58 from the first electronic circuit 40, a programmable controller circuit 64, a rechargeable battery circuit 66, a low battery circuit 68, and a visual locating indicia generating device 70. Preferably, the visual indicia generating device is a bright flashing light such as a stroboscopic light emitting diode.

Figure 3:
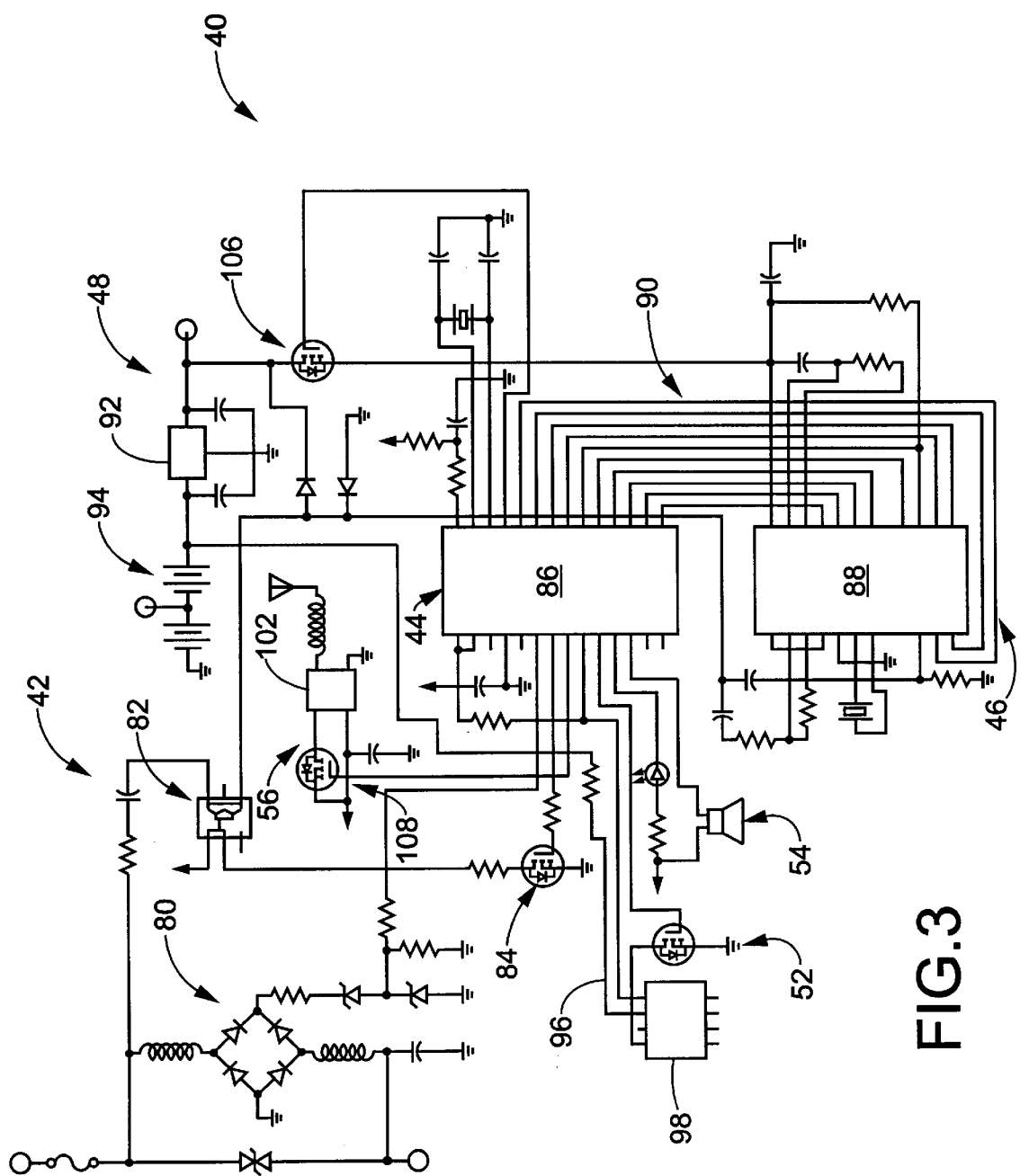
FIG. 3 is a schematic diagram of a first electronic circuit used to interface the signaling device of the present invention to a telephone service line.

Turning now to FIG. 3, the details of the first preferred embodiment of the first electronic circuit 40 are shown on the electronic component level. As illustrated, the interface circuit 42 includes a standard rectifier bridge circuit 80 commonly found in the art. An optical isolator 82 is enabled by the programmable controller circuit 44 through an electronic switch 84 to deliver incoming dual tone signals (DTMF) to the decoder circuit 46 for decoding and interpretation there. In the preferred embodiment illustrated, the programmable controller circuit 44 is a programmable microcontroller 86 model PIC16C55 available from Microchip. Further as illustrated in the drawing, the decoder circuit 46 is a bidirectional DTMF decoder 88 model MT8885 available from Mitel.

In the subject embodiment, dual tone signals are decoded by the bidirectional DTMF decoder 88 and are delivered to the programmable microcontroller 86 on a set of bidirectional parallel interface lines 90. In that way, the programmable microcontroller 86 is enabled to "listen" in on the telephone service line 34 and determine when a dispatcher transmits a unique predetermined dual tone (DTMF) signal or unique sequence of dual tone signals to thereby control the subject signaling system 10 to illuminate the visual indicia in a manner described above to enable the responding personnel to find the caller's location.

With continued reference to FIG. 3, the rechargeable battery circuit 48 includes an integrated circuit voltage regulator 92 for connecting a set of batteries 94 to the remainder of the subject first electronic circuit 40 to provide power thereto. A raw voltage battery signal is delivered to a low battery circuit 52 on a battery signal line 96. The battery signal line 96 is connected directly from the set of batteries 94 to an integrated circuit low battery voltage detector 98 as shown. The low battery voltage detector circuit is selectively enabled by the programmable microcontroller 86 to periodically sample and report raw battery voltage data. Periodic sampling of battery voltage conserves battery life. When the programmable microcontroller 86 determines that the raw battery voltage is below a predetermined threshold, the low battery alarm circuit 54 is activated to generate an audible signal to alert the building occupants that the batteries need to be replaced or serviced.

With yet continued reference to FIG. 3, the signal alarm generator circuit 56 includes an integrated circuit radio frequency generator 102 that is connected directly to a transmitting tuned antenna 104. Operationally, the programmable microcontroller 86 selectively enables the optical isolator 82 through the electronic switch 84 whenever an ingoing or outgoing call is placed as determined through the rectifier bridge circuit 80. At that time, the programmable microcontroller 86 enables the bidirectional DTMF decoder 88 through an electronic switch 106. When the decoder 88 is enabled, the incoming signals are decoded and transferred to the programmable microcontroller 86 via the set of bidirectional parallel interface lines 90. The programmable microcontroller 86 includes a customized program stored in non-volatile memory for interrogating the decoded signals delivered from the decoder circuit 88. Whenever the decoded signals match a predetermined signal stored in the microcontroller, the signal alarm generator circuit 56 is enabled through an electronic switch 108. At that time, the radio frequency generator 102 is activated to generate the alarm signal 58 (FIG. 2) to in turn activate the second electronic circuit 60 in a manner described above in connection with FIG. 2.

The programmable microcontroller 86 also includes a customized program stored in non-volatile memory for interrogating an internal timer/counter register to determine the length of time that the second electronic circuit 60 has been activated. After a predetermined programmable time out period, the signal alarm generator circuit 56 is enabled through the electronic switch 108. At that time, the radio frequency generator 102 is activated to generate a time out signal 58' to in turn de-activate the second electronic circuit 60, thereby disabling the visual indicia at the caller's location in a manner described above. The programmable microcontroller 86 is also responsive to predetermined command signals from the dispatcher to activate the radio frequency generator 102 to generate the time out signal 58' to in turn de-activate the second electronic circuit 60 thereby disabling the visual indicia at the caller's location in a manner described above.

Figure 4:
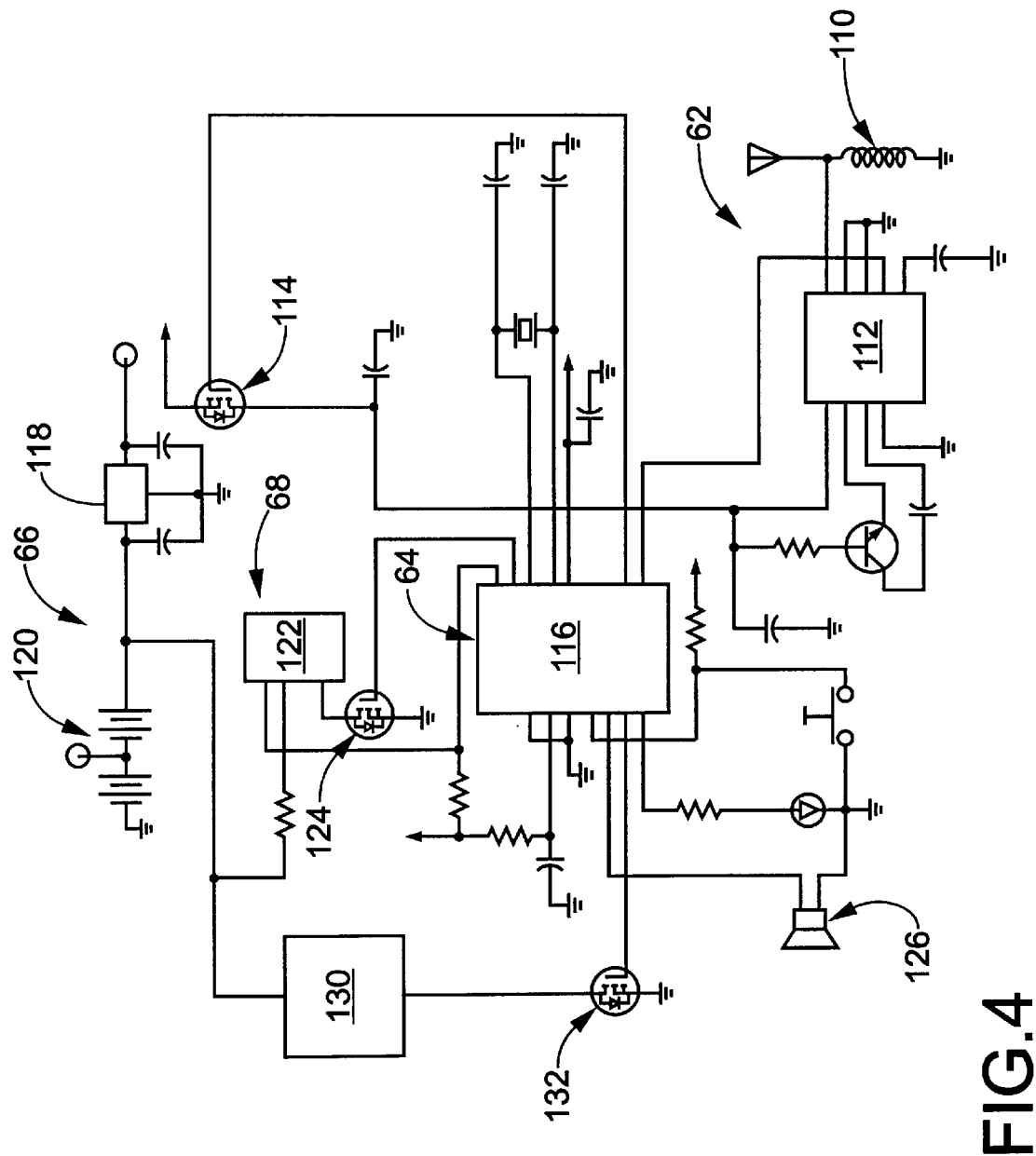
FIG. 4 is a schematic diagram of a second electronic circuit used to interface the signaling device of the present invention with the first electronic circuit shown in FIG. 3.

Turning next to FIG. 4, the first preferred embodiment of the second electronic circuit 60 is shown in detail on the electronic component level. As illustrated there, the alarm signal receiving circuit 62 includes a tuned antenna 110 that is coupled directly to an integrated circuit decoder 112. The integrated circuit decoder 112 is selectively enabled by the programmable controller circuit 64 through periodic closing of an electronic switch 114. In that way, the alarm signal receiving circuit is alternately placed in "sleep" and "active" modes. In accordance with the preferred embodiment of the present invention, the alternating sleep and active modes conserve battery energy. The programmable controller circuit 64 is preferably a programmable microcontroller 116 available from Microchip as model number PC16C54.

With continued reference to FIG. 4, the rechargeable battery circuit 66 includes an electronic voltage regulator 118 that connects a set of batteries 120 to a source of recharge energy. The low battery circuit 68 is fashioned similar to the low battery circuit 52 described above in connection with the first electronic circuit 40. To that end, the low battery circuit 68 of the second electronic circuit 60 shown in FIG. 4 includes an integrated circuit low battery voltage detector 122 that is selectively energized by the programmable microcontroller 116 through an electronic switch 124. The low battery voltage detector is connected directly to the set of batteries. The programmable microcontroller 116 includes an internal program that functions to activate the low battery voltage detector 122 and determine that the raw battery voltage. The sensed raw battery voltage is inspected by the microcontroller and when it is below a predetermined threshold value, a piezoelectric alarm 126 is energized to generate an audible signal to alert building occupants that the set of batteries 120 contains insufficient charge.

Operationally, when the alarm signal receiving circuit 62 is energized in the active mode and the programmable controller circuit 64 recognizes the alarm signal 58 received onto the tuned antenna 110, the programmable microcontroller 116 energizes a high intensity stroboscopic light emitting diode 130 through energization of an electronic switch 132. In that way, the light emitting diode provides visual locating indicia to assist responding personnel in identifying the caller's location.

Further, with regard to the visual indicia time out function, when the alarm signal receiving circuit 62 is energized in the active mode and the programmable controller circuit 64 recognizes the time out signal 58' received onto the tuned antenna 110, the programmable microcontroller 116 de-energizes the high intensity stroboscopic light emitting diode 130 through de-energization of the electronic switch 132. In that way, the locating indicia used to assist responding personnel in identifying the caller's location can be extinguished. The time out signal 58' received onto the tuned antenna 110 can be generated by the first circuit 40 or by a hand held radio frequency generator circuit operated by the responding personnel to turn off the visual indicia in a manner described above.

Figure 5:
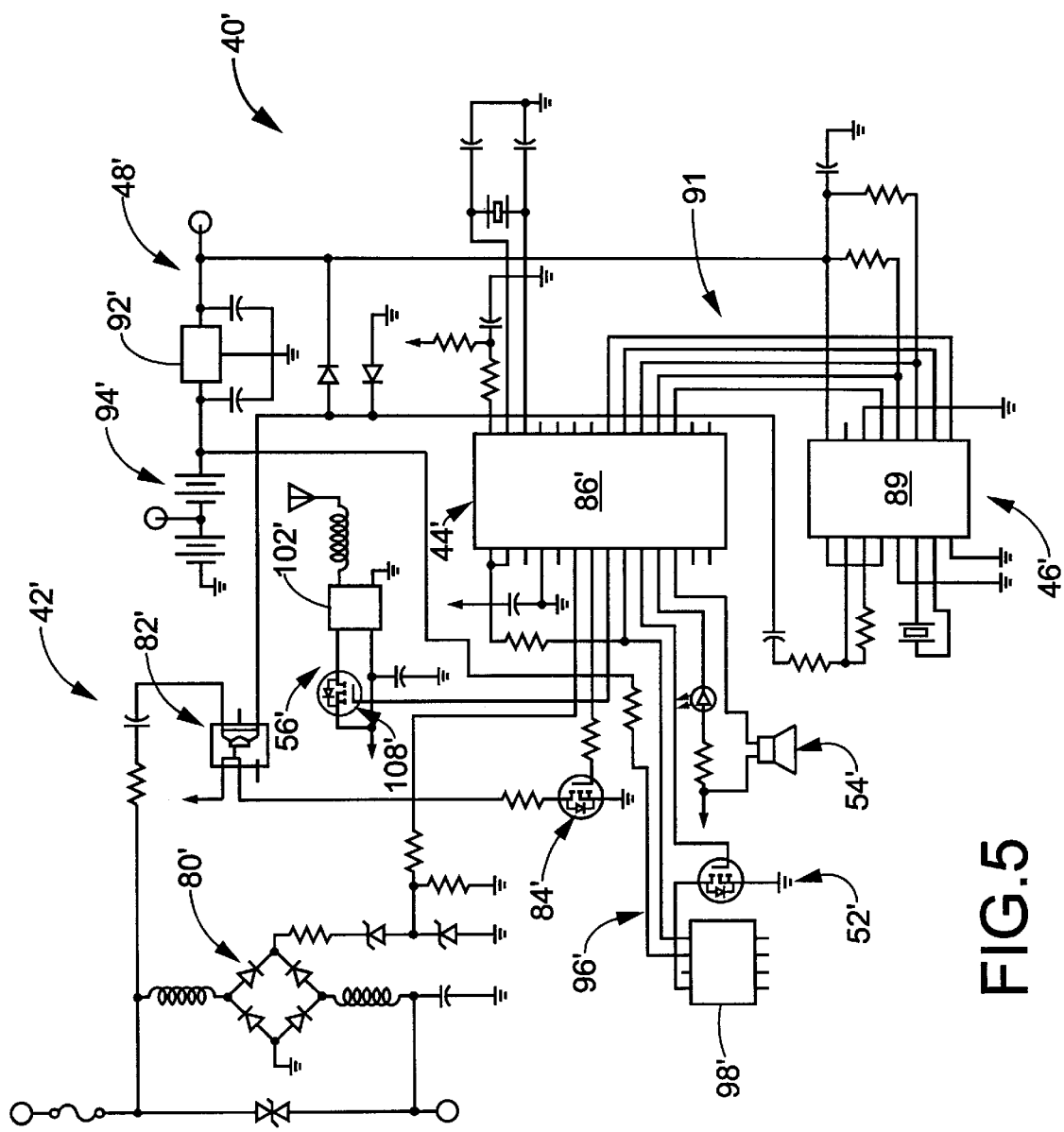
FIG. 5 is a schematic diagram of a second preferred embodiment of the first electronic circuit that is provided as an alternative to the electronic circuit illustrated in FIG. 3; and, FIG. 6 is flow chart illustrating a method of using the signaling system of the present invention.

A second preferred embodiment of the first electronic circuit of the present invention interconnected with the telephone service line is illustrated in FIG. 5 on the component level. Where the first and second embodiments of the first electronic circuit are similar or have equivalent functionality, they will be described and designated in the drawings with similar reference numerals but with a primed ("'") designation. As illustrated in FIG. 5, the interface circuit 42' includes a standard rectifier bridge circuit 80' commonly found in the art. An optical isolator 82' is enabled by the programmable controller circuit 44' through an electronic switch 84' to deliver incoming modem signals to the decoder circuit 46' for interpretation there. In the second preferred embodiment of the first electronic circuit illustrated, the programmable controller circuit 44' is a programmable microcontroller 86' available from Microchip model PIC16C55. Further as illustrated in the drawing, the decoder circuit 46' is a bidirectional modem decoder 89 model MT8841 available from Mitel. In the subject embodiment, modem signals are decoded by the bidirectional modem decoder 89 and are delivered to the programmable microcontroller 86' on a set of bidirectional serial interface lines 91. In that way, the programmable microcontroller 86' can determine when a dispatcher transmits a unique predetermined modem signal to the first electronic circuit 40' to thereby control the subject signaling system 10 to illuminate the light emitting diode in a manner described above.

With continued reference to FIG. 5, the rechargeable battery circuit 48' includes an integrated circuit voltage regulator 92' for connecting a set of batteries 94' to the remainder of the subject first electronic circuit 40' to provide power thereto. A raw voltage battery signal is delivered to a low battery circuit 52' on a battery signal line 96'. The battery signal line 96' is connected directly from the set of batteries 94' to an integrated circuit low battery voltage detector 98' as shown. The low battery voltage detector circuit is selectively enabled by the programmable microcontroller 86' to periodically sample and report raw battery voltage data. Periodic sampling of battery voltage conserves battery life. When the programmable microcontroller 86' determines that the raw battery voltage is below a predetermined threshold, the low battery alarm circuit 54' is activated to generate an audible warning signal to building occupants.

With yet further continued reference to FIG. 5, the signal alarm generator circuit 56 includes an integrated circuit radio frequency generator 102' that is connected directly to a transmitting tuned antenna 104'. Operationally, the programmable microcontroller 86' selectively enables the optical isolator 82' through the electronic switch 84' whenever an ingoing or outgoing call is placed as determined through the rectifier bridge circuit 80'. At that time, the programmable microcontroller 86' enables the bidirectional modem decoder 89 through an electronic switch 106'. When the modem decoder 89 is enabled, the incoming signals are decoded and transferred to the programmable microcontroller 86' via a set of bidirectional serial interface lines 91. The programmable microcontroller 86' includes a customized program stored in non-volatile memory for interrogating the decoded signals delivered from the decoder circuit 89. Whenever the decoded signals match a predetermined signal stored in the microcontroller, the signal alarm generator circuit 56' is enabled through an electronic switch 108'. At that time, the radio frequency generator 102' is activated to generate the alarm signal to in turn activate the second electronic circuit 60 in the manner described above in connection with FIGS. 2–4. Generally, the embodiment shown in FIG. 5 has all of the capabilities and operates in the manner of the device illustrated in FIG. 2 with the exception that the device in FIG. 2 is responsive to DTMF signals and the device in FIG. 5 is responsive to modem signals.

It is apparent from the above that the present invention allows the use of the device in a manner not previously available to "9-1-1" emergency system dispatchers or any other telephone based emergency or security systems. For the first time, the activation of a visual locating indicia to assist responding personnel in identifying the specific site of a caller in need of emergency or other type of assistance is possible based upon the judgment of the person who dispatches the emergency or security team to the site, i.e. the dispatcher. The method of the present invention enabled by the device of the invention reduces the confusion created by other telephone based emergency locator systems that have heretofore been proposed.

Figure 6:
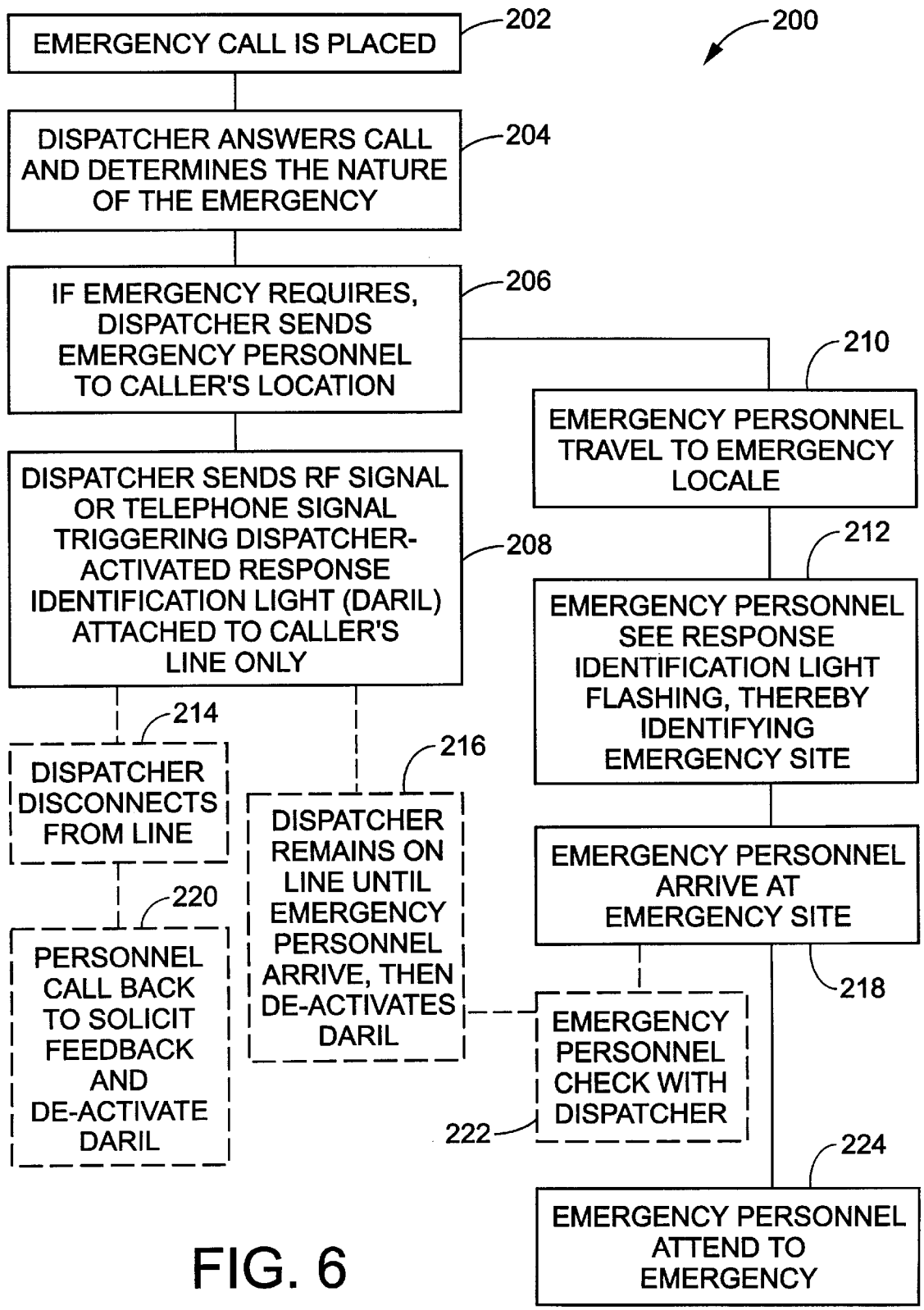

Thus, as shown in the method illustrated in FIG. 6, the original steps are initiated by an occupant of a structure who calls typically to report an emergency situation. Although the method of the present invention will be described in connection with calls placed to "9-1-1" emergency systems, it is intended to cover any calls placed to any centralized dispatcher type systems including emergency service type systems as well as security systems or the like.

Turning now to FIG. 6, as described above, the method of the present invention is initiated by an occupant of a structure who calls to report an emergency situation. Dispatchers working on the "9-1-1" systems are trained to evaluate emergency calls to determine the nature of the emergency so the proper emergency personnel can be dispatched. In many cases, no emergency personnel are necessary, so none are dispatched.

A judgment is made by the "9-1-1" dispatcher at step 204 of the method. In step 206, the dispatcher sends the responding personnel to the caller's address. Step 208 may be simultaneous with step 206 in that the dispatcher causes a dual tone signal (DTMF), sequence of tones, or modem signals to be transmitted over the telephone lines or to cause radio frequency signals to be transmitted over the air waves, each to trigger the emergency locator system 10 that is attached to the caller's phone line or located at the caller's residence. Other calls reporting the same emergency would likely be recognized by the "9-1-1" dispatcher, so additional emergency locators in the neighborhood of the original caller would not be activated. This is at the discretion of the dispatcher and not at the discretion of the caller.

In most typical cases, the "9-1-1" dispatcher holds on the line to be the contact person linking the emergency site to the sources of emergency aid. Often, the dispatcher advises the caller of steps to talk to ameliorate the emergency before the emergency personnel arrive. Meanwhile, the responding personnel travel to the emergency locale and, upon seeing the visible locating indicia, preferably an emergency signal flasher, know exactly where the emergency is located.

Common practice is for the emergency personnel to advise the "9-1-1" dispatcher of their arrival by picking up the telephone and talking to the dispatcher. The dispatcher may have gained from the caller additional information that was not transmitted to the emergency response personnel by radio. The dispatcher then would deactivate the subject locating system by sending another dual tone, sequence of tones, or radio frequency signal over the telephone line or air waves, respectively. Alternatively, as described above, the signaling device may be permitted to time out and self-extinguish the visual indicia.

As yet another alternative, in cases in which the telephone contact is not maintained, the responding personnel on the scene at the caller's location deactivate the subject locating system by means of a hand-held tone generator or radio frequency generator capable of emitting the required dual tone signal (DTMF), sequence of tone signals, or radio frequency signal on the telephone line or air waves, respectively, thereby resetting the locating system of the present invention locally. Such a portable tone generator enables the responding personnel to re-initiate the subject response identification system to aid back-up personnel to locate the emergency, should they be needed.

In the preferred embodiment, the programmable controller circuit of the second electronic circuit includes a programmed automatic shut-off time delay so that the stroboscopic light emitting diode is extinguished after a predetermined period of time programmed into the microcontroller circuit. Alternatively, a reset button is provided on the second electronic circuit to reset the program counter of the programmable microcontroller 116, 116' thereby extinguishing the light emitting diode and placing the second electronic circuit in a state that it waits to receive the alarm signal 58 from the first electronic circuit 40.

In yet another scenario, the de-activation of the device could be accomplished remotely during a follow-up call to the emergency site by the dispatcher or by other follow-up personnel who might also collect data regarding timeliness and quality of service delivered by the emergency system.

The invention has been described with reference to the preferred embodiments. Obviously, modifications and alterations will occur to others upon a reading and understanding of this specification such as, for example, transmitting all of the subject signals between the dispatcher and the caller via a signal superimposed on the electric utility line 60 Hz. signal. Further, underground or overhead cables could be used, such as the wires used for cable television, to carry the subject signals between the dispatcher and the caller. It is intended to include all such modifications, alterations, and extensions insofar as they come within the scope of the appended claims or the equivalents thereof.

Having thus described the invention, it is claimed:

1. A signaling system that is responsive exclusively to a predefined signal transmitted from a dispatcher at a first location through a telephone service line interconnected thereby with a telephone at a second location to assist responding personnel in identifying the second location when the predefined signal is transmitted from the first location, the signaling system comprising:

a first electronic circuit interconnected with said telephone service line, the first electronic circuit being adapted to generate a first signal at said second location in response exclusively to said predefined signal transmitted from the dispatcher at the first location through said telephone service line; and, a second electronic circuit associated with the first electronic circuit at said second location and disconnected from said telephone service line, the second electronic circuit being adapted to generate a visual locating indicia at said second location in response to said first signal transmitted from said first circuit, the visual locating indicia being directly intelligible by the responding personnel.

2. The signaling system according to claim 1 wherein:

said first electronic circuit includes:

a decoder circuit adapted to decode said predefined signal transmitted through said telephone service line and generate a decoded signal;

a first control circuit adapted to receive the decoded signal and generate a radio frequency enable signal in response to receiving the decoded signal; and, a radio frequency transmitting circuit for generating said first signal in response to said radio frequency enable signal from said first control circuit; and, said second electronic circuit includes:

a radio frequency receiving circuit adapted to receive said first signal from the radio frequency transmitting circuit and generate an acknowledgment signal in response to receiving the first signal;

a second control circuit adapted to receive the acknowledgment signal and generate a locating indicia enable signal in response to receiving the acknowledgment signal; and, a visual indicia device operatively connected to the second control circuit and responsive to the locating indicia enable signal to generate said visual locating indicia at said second location to assist said responding personnel in identifying the second location.

3. The signaling system according to claim 2 wherein:

said decoder circuit is adapted to i) receive a dual tone signal as said predefined signal transmitted through said telephone, ii) decode the dual tone signal, and iii) generate said decoded signal in response to receiving the dual tone signal;

said radio frequency transmitting circuit is adapted to generate a radio frequency signal as said first signal in response to said radio frequency enable signal from said first control circuit; and, said radio frequency receiving circuit is adapted to receive said radio frequency signal from the radio frequency transmitting circuit and generate said acknowledgment signal in response to receiving the radio frequency signal.

4. The signaling system according to claim 3 wherein:

said first control circuit includes a first programmable microprocessor;

said second control circuit includes a second programmable microprocessor;

said first electronic circuit includes a first battery power source and a first low battery detection circuit operable with said first programmable microprocessor to determine a relative strength of said first battery power source and generate a first low battery alarm signal when the relative strength of the first battery power source is below a first predetermined threshold; and, said second electronic circuit includes a second battery power source and a second low battery detection circuit operable with said second programmable microprocessor to determine a relative strength of said second battery power source and generate a second low battery alarm signal when the relative strength of the second battery power source is below a second predetermined threshold.

5. The signaling system according to claim 2 wherein:

said decoder circuit is adapted to i) receive a sequence of tone signals as said predefined signal transmitted through said telephone, ii) decode the sequence of tone signals, and iii) generate said decoded signal in response to receiving the sequence of tone signals;

said radio frequency transmitting circuit is adapted to generate a radio frequency signal as said first signal in response to said radio frequency enable signal from said first control circuit; and, said radio frequency receiving circuit is adapted to receive said radio frequency signal from the radio frequency transmitting circuit and generate said acknowledgment signal in response to receiving the radio frequency signal.

6. The signaling system according to claim 5 wherein:

said first control circuit includes a first programmable microprocessor;

said second control circuit includes a second programmable microprocessor;

said first electronic circuit includes a first battery power source and a first low battery detection circuit operable with said first programmable microprocessor to determine a relative strength of said first battery power source and generate a first low battery alarm signal when the relative strength of the first battery power source is below a first predetermined threshold; and, said second electronic circuit includes a second battery power source and a second low battery detection circuit operable with said second programmable microprocessor to determine a relative strength of said second battery power source and generate a second low battery alarm signal when the relative strength of the second battery power source is below a second predetermined threshold.

7. The signaling system according to claim 2 wherein:

said decoder circuit is adapted to i) receive modem tone signals as said predefined signal transmitted through said telephone, ii) decode the modem tone signals, and iii) generate said decoded signal in response to receiving the modem tone signals;

said radio frequency transmitting circuit is adapted to generate a radio frequency signal as said first signal in response to said radio frequency enable signal from said first control circuit; and, said radio frequency receiving circuit is adapted to receive said radio frequency signal from the radio frequency transmitting circuit and generate said acknowledgment signal in response to receiving the radio frequency signal.

8. The signaling system according to claim 7 wherein:

said first control circuit includes a first programmable microprocessor;

said second control circuit includes a second programmable microprocessor;

said first electronic circuit includes a first battery power source and a first low battery detection circuit operable with said first programmable microprocessor to determine a relative strength of said first battery power source and generate a first low battery alarm signal when the relative strength of the first battery power source is below a first predetermined threshold; and, said second electronic circuit includes a second battery power source and a second low battery detection circuit operable with said second programmable microprocessor to determine a relative strength of said second battery power source and generate a second low battery alarm signal when the relative strength of the second battery power source is below a second predetermined threshold.

9. The signaling system according to claim 1 wherein at least a one of said first electronic circuit and said second electronic circuit includes a timer for disabling said visual locating indicia after a predetermined time period following said first signal being transmitted from said first circuit.

10. The signaling system according to claim 1 wherein:

said first circuit is adapted to generate a first disable signal at said second location in response to a predefined dispatcher disable signal transmitted through said telephone service line; and, said second electronic circuit is adapted to disable said visual locating indicia in response to said first disable signal transmitted from said first circuit.

11. The signaling system according to claim 1 wherein said second electronic circuit is adapted to disable said visual locating indicia in response to receiving a first disable signal.

12. A signaling system that is responsive to a predefined radio frequency signal transmitted from a dispatcher at a first location through the air to a second location to assist responding personnel associated with said dispatcher in identifying the second location from among other locations not the second location when the predefined radio frequency signal is transmitted from the first location to the second location, the signaling system comprising:

a radio frequency receiving circuit adapted to receive said first radio frequency signal from the first location and generate a first electronic signal in response to receiving the first radio frequency signal;

a decoder circuit adapted to decode said first electronic signal and generate a decoded signal;

a programmable microprocessor circuit adapted to receive the decoded signal and generate a locating indicia enable signal when the decoded signal matches a predetermined identification code stored in programmable microprocessor circuit; and, a visual locating indicia device operatively connected to the programmable microprocessor circuit and responsive to the locating indicia enable signal to generate a visual indicia at said second location in response to said first radio frequency signal transmitted from said first circuit, the visual indicia being directly intelligible by the responding personnel to assist said responding personnel in identifying the second location.

13. The signaling system according to claim 12 further comprising a battery power source and a low battery detection circuit operable with said programmable microprocessor circuit to determine a relative strength of said battery power source and generate a low battery alarm signal when the relative strength of the battery power source is below a predetermined threshold.

14. The signaling system according to claim 12 wherein:

said radio frequency receiving circuit is adapted to receive a second radio frequency signal and generate a second electronic signal in response to receiving the second radio frequency signal;

said decoder circuit is adapted to decode said second electronic signal and generate a second decoded signal;

said programmable microprocessor circuit is adapted to receive the second decoded signal and generate a locating indicia disable signal when the second decoded signal matches a predetermined disable identification code stored in programmable microprocessor circuit; and, said visual locating indicia device is responsive to the locating indicia disable signal to de-activate said visual indicia in response to said second radio frequency signal received by said radio frequency receiving circuit.

15. The signaling system according to claim 12 further including a timer for de-activating said visual indicia after a predetermined time period.

16. A method of generating visual indicia to assist responding personnel in locating a premises, the method comprising the steps of:

providing a signaling system that is responsive exclusively to a predefined signal transmitted from a dispatcher at a first location to the signaling system at a second location to assist responding personnel in identifying the second location;

receiving the predefined signal into the signaling system;

decoding the predefined signal as a decoded signal using a programmable microprocessor in the signaling system; and, when the decoded signal matches a predefined signal stored in the signaling system, activating a visual indicia at the second location to assist responding personnel in identifying the second location.

17. The method according to claim 16 wherein the step of receiving the predefined signal into the signaling system includes receiving at least a one of a dual tone (DTMF) signal, a sequence of tone signals, modem tone signals, and a radio frequency signal.

18. The method according to claim 17 wherein the step of activating the visual indicia at said second location to assist the responding personnel in identifying the second location includes de-activating the visual indicia after a predetermined time period.

19. The method according to claim 17 wherein the step of activating the visual indicia at said second location to assist the responding personnel in identifying the second location includes de-activating the visual indicia after receiving a de-activation signal from a one of the dispatcher and the responding personnel.

20. The method according to claim 16 further including the steps of:

charging a battery in the signaling system;

determining a charge level of said battery; and, when the charge level of said battery is below a predetermined level, generating a low battery signal in the signaling system.

* * * * *